UNITED STATES PATENT OFFICE.

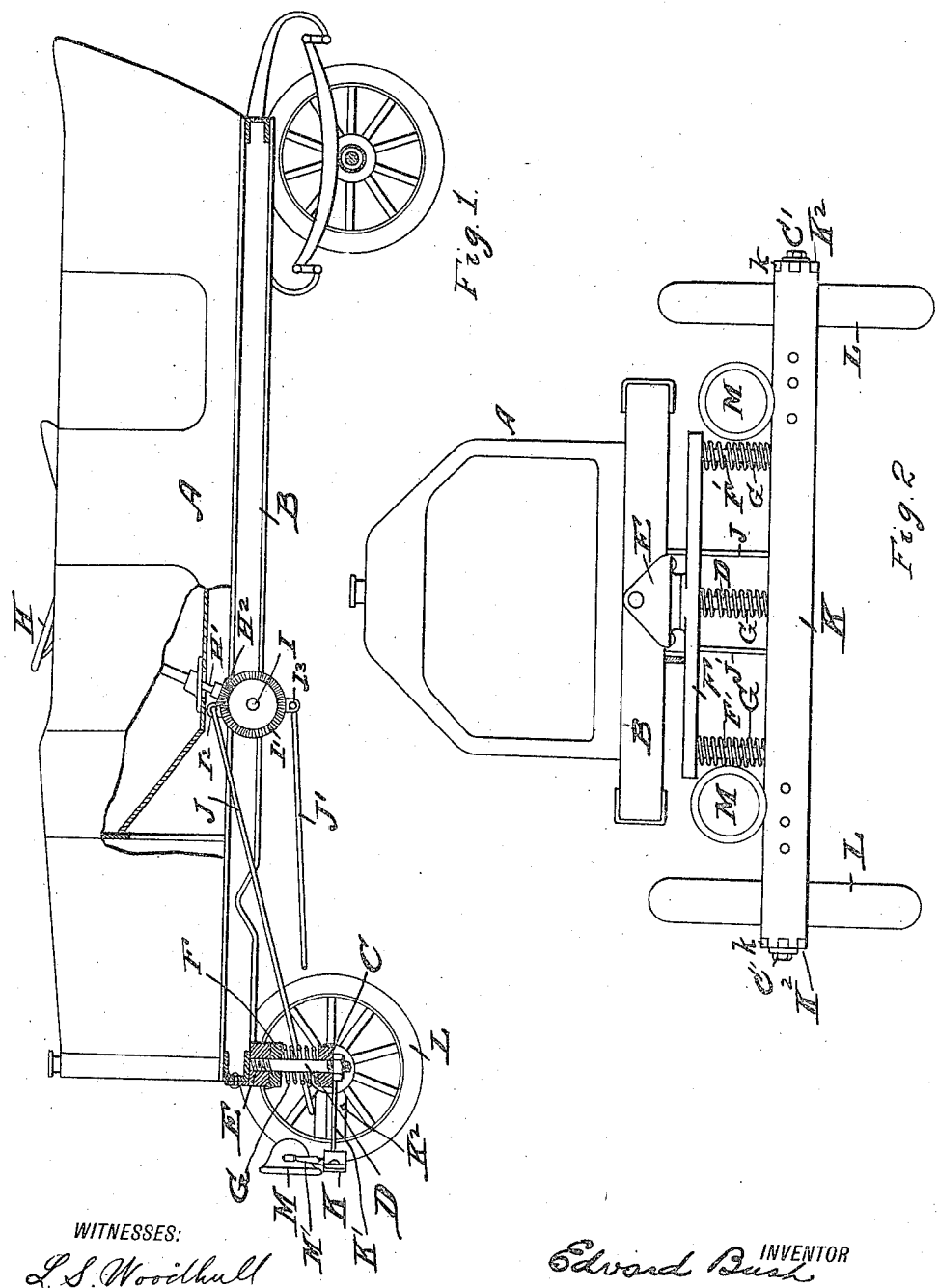

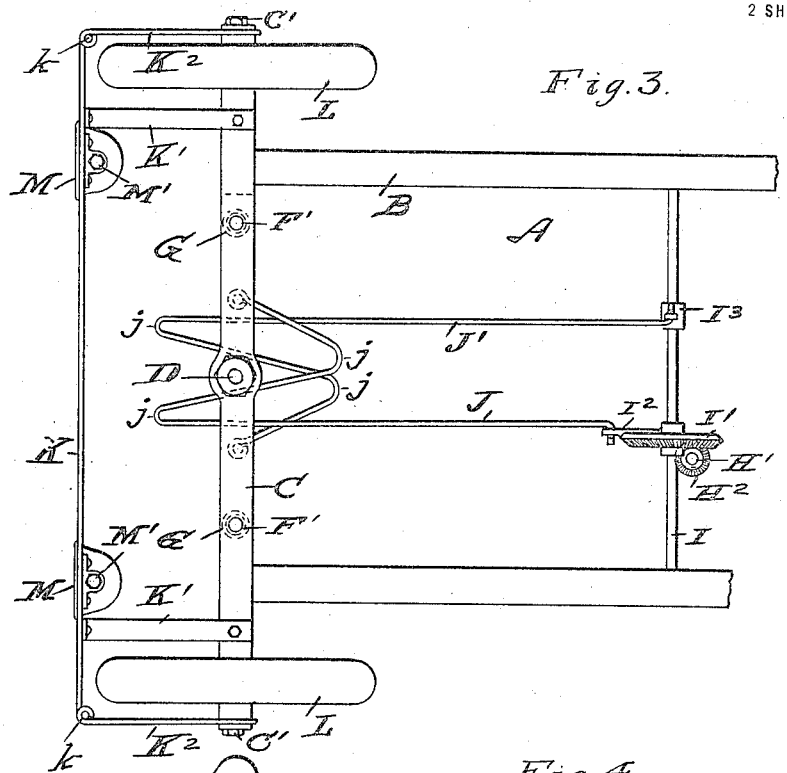
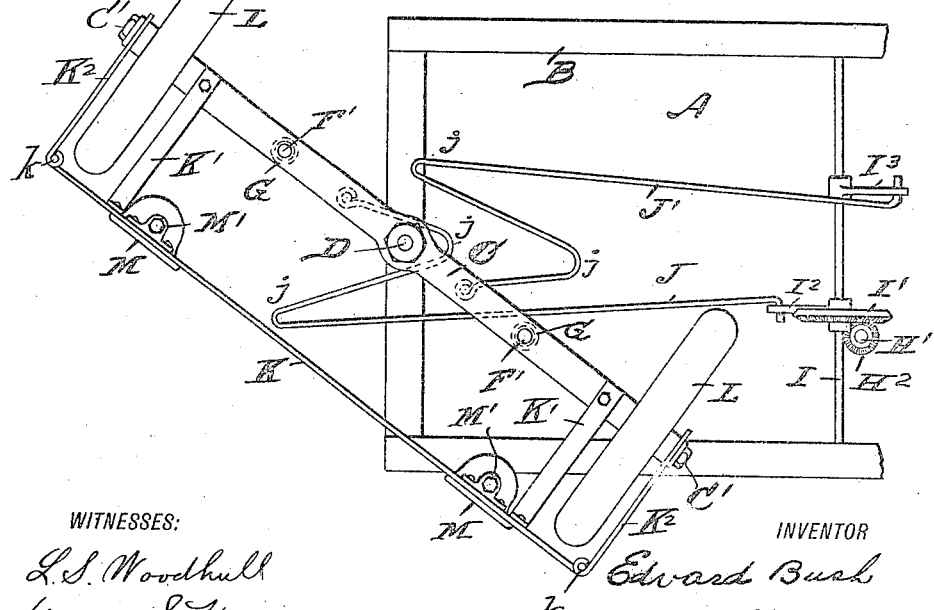

EDVARD BUSH, OF DELRAY, MICHIGAN.

MOTOR-VEHICLE.

1,240,936. Specification of Letters Patent. Patented Sept. 25, 1917.

Application filed December 26, 1916. Serial No. 139,037.

*To all whom it may concern:*

Be it known that I, EDVARD BUSH, a subject of the Kingdom of Hungary, residing at Delray, county of Wayne, State of Michigan, have invented a certain new and useful Improvement in Motor-Vehicles, and declare the following to be a full, clear, and exact description of the same, such as will enable others skilled in the art to which it pertains to make and use the same, reference being had to the accompanying drawings, which form a part of this specification.

My invention relates to the general construction of motor vehicles, but more particularly to the running gear of the vehicle, as shown in the accompanying drawings and described in the following specification and claims.

It is well known that as ordinarily constructed, the running gear of a motor vehicle renders it impossible for the driver of the vehicle to turn on a narrow street or roadway that he may proceed in the opposite direction without making several forward and reverse movements of the vehicle while gradually turning toward the direction he may desire to go.

It is therefore one of the objects of this invention to so construct the running gear that the forward axle may be turned on a central pivot or king bolt, through the operation of the steering wheels by means of suitable mechanism connecting the steering wheel with the forward axle.

Another feature of the invention is the peculiar form of link connection between the crank shaft (actuated through the operation of the steering wheel) and the forward axle, the arrangement being such as will not interfere with motor or other operating parts usually housed in the forward portion of the vehicle's chassis.

Another feature of the invention is the spring suspension carried by the forward axle, which is especially adapted for the requirements of the present invention.

Another feature of the invention is the bumper rail, (supported by arms bolted to the forward axle) extending across the front of the car in advance of the wheels and having hinged side plates secured to the axle by the respective cap nuts of the latter:—the bumper rail also serves as a support for the lamp brackets.

Other advantages and improvements will appear as the description proceeds, it being understood that changes may be made in the precise embodiment of the invention as herein disclosed without departing from the spirit of the invention.

In the drawings accompanying this specification:

Figure 1 is a side elevation of a motor driven vehicle with parts broken away and in section to more clearly disclose the invention.

Fig. 2 is an end elevation of the vehicle showing the forward spring suspension, the bumper, and lamps supported thereby.

Fig. 3 is an inverted plan view of the forward end of the vehicle with the axle and wheels in position to drive the vehicle in a forward direction.

Fig. 4 is a similar inverted view showing the forward axle turned on its central pivot or king bolt, showing one of the wheels as it would appear beneath the frame when making a "short" turn.

Referring now to the letters of reference placed upon the drawings:—

A, denotes the body of the vehicle; B, its chassis or frame. C, indicates the forward axle.

D, designates a king bolt by which the axle is pivoted to a fitting E, bolted to the frame or chassis.

F, is a cross member, located in spaced relation to the axle, through which the king bolt extends to engage the chassis, and F', F', are bolts carried by the cross member projecting downwardly through apertures provided in the axle;—the respective bolts, including the king bolt being free to move through the axle. G, designates springs coiled upon the bolts D, and F', F', which bear upon the axle C, and the cross member F. H, denotes a steering wheel and H', a steering column suitably journaled and fitted with a bevel gear $H^2$, at its lower end. I, is transverse rock-shaft journaled in the frame, on which is mounted a beveled gear I', in mesh with the gear $H^2$. $I^2$, is a crank arm bolted to the gear I', and J, denotes a rod connecting the crank arm $1^2$, with the forward axle to which it is pivoted in spaced relation to the king bolt on one side of the latter. J', is a similar rod pivoted to the front axle, on the opposite side of the king bolt and connected with a crank arm $1^3$, carried by the shaft I. It will be noted that the respective connecting rods J, and J', are provided with return bends as indicated at *j;* the major portion of the rods being spaced apart and operating in substantially parallel lines to accommodate the motor and other mechanical parts (not shown) supported by the chassis. The return bend in the connecting rods also serves another purpose by affording a slight resilient action which serves to absorb shocks that might otherwise be directed toward the controlling gearing.

Having indicated the several parts by reference letters the construction and operation of the device will be readily understood.

To change the direction of the vehicle from that previously taken it is only necessary to operate the steering wheel in the usual manner, thereby actuating the rock shaft I, through the connecting bevel gears. The rods J, and J', connecting the crank arms of the rock shaft with the forward axle are thus operated to turn the axle upon the king bolt to change the direction of the car,—it being apparent that a much shorter turn may be made than would be possible when shifting the position of wheels pivoted at each end of the axle,—as ordinarily employed in motor driven vehicles. It will also be noted that the peculiar form given to the rods connecting the rock shaft with the front axle provides for the installation of the motor and coöperating parts in the chassis, without interfering with their operation;— the return bend at the forward end of rods also serving to provide certain resilient action adapted to absorb the road shocks which might otherwise be directed to the steering column and coöperating parts.

Having thus described my invention what I claim is:—

1. In combination, a frame, an axle having pivotal connection intermediate its ends with the said frame, a steering member, and longitudinally disposed rods between the axle and steering member having return bends at their forward ends which cross and extend forwardly and rearwardly of the axle when the latter is set to steer the vehicle in a direct line.

2. In combination, a frame, an axle having pivotal connection intermediate its ends with the said frame, a transversely arranged rock shaft, a steering column geared to the rock shaft, rods having their rear ends connected with the rock shaft to move longitudinally in opposite directions when turning the rock shaft, said rods having return bends at their forward ends which cross and are pivoted to the axle upon opposite sides of its pivotal connection with the frame.

In testimony whereof, I sign this specification in the presence of two witnesses.

EDVARD BUSH.

Witnesses:
S. E. THOMAS,
N. HURLEY.

Copies of this patent may be obtained for five cents each, by addressing the "Commissioner of Patents, Washington, D. C."